United States Patent
Song et al.

(10) Patent No.: US 9,374,350 B2
(45) Date of Patent: Jun. 21, 2016

(54) AUTHENTICATING METHOD OF COMMUNICATING CONNECTION, GATEWAY APPARATUS USING AUTHENTICATING METHOD, AND COMMUNICATION SYSTEM USING AUTHENTICATING METHOD

(75) Inventors: Kwan-woo Song, Yongin-si (KR); Dong-ik Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 304 days.

(21) Appl. No.: 13/372,041

(22) Filed: Feb. 13, 2012

(65) Prior Publication Data

US 2012/0233468 A1 Sep. 13, 2012

(30) Foreign Application Priority Data

Mar. 10, 2011 (KR) ........................ 10-2011-0021432

(51) Int. Cl.
*H04L 29/06* (2006.01)
*H04L 9/08* (2006.01)
*H04L 12/28* (2006.01)
(Continued)

(52) U.S. Cl.
CPC ............... *H04L 63/08* (2013.01); *H04L 9/0838* (2013.01); *H04L 9/32* (2013.01); *H04L 12/28* (2013.01); *H04L 63/0428* (2013.01); *H04L 63/061* (2013.01); *H04L 63/10* (2013.01); *H04W 72/04* (2013.01)

(58) Field of Classification Search
CPC . H04L 9/0838; H04L 63/061; H04L 63/0428; H04L 63/08; H04L 63/10; H04L 12/28; H04L 9/32; H04W 72/04

USPC .................... 713/171; 726/12, 2, 4
See application file for complete search history.

(56) References Cited

U.S. PATENT DOCUMENTS 7,289,631 B2 * 10/2007 Ishidoshiro ................... 380/270
7,814,322 B2 * 10/2010 Gurevich et al. ............. 713/171
7,861,284 B2 * 12/2010 Okamoto et al. ................. 726/3
(Continued)

FOREIGN PATENT DOCUMENTS

| EP | 1383327 | 1/2004 |
| JP | 2003-23441 | 1/2003 |

(Continued)

OTHER PUBLICATIONS

Extended European Search Report issued Jul. 3, 2012 in corresponding European Patent Application No. 11194379.1.

*Primary Examiner* — Mohammad A Siddiqi
(74) *Attorney, Agent, or Firm* — Staas & Halsey LLP

(57) ABSTRACT

An authenticating method of communicating connection between a terminal and a gateway apparatus, the method including transmitting authentication information and first intrinsic identification information that is intrinsic identification information of the terminal from the terminal to the gateway apparatus and requesting the authentication; authenticating the communicating connection by using at least one of the first intrinsic identification information and the authentication information; and when the authenticating is successful, generating at least one authentication key by using at least one of the first intrinsic identification information and second intrinsic identification information that is intrinsic identification information of the gateway apparatus, thereby increasing communication security between the terminal and the gateway apparatus.

19 Claims, 7 Drawing Sheets

(51) Int. Cl.
*H04L 9/32* (2006.01)
*H04W 72/04* (2009.01)

(56) References Cited

U.S. PATENT DOCUMENTS

| | | | |
|---|---|---|---|
| 2004/0128538 A1* | 7/2004 | Gmuender | H04L 29/06 726/4 |
| 2006/0062391 A1* | 3/2006 | Lee et al. | 380/270 |
| 2006/0242412 A1* | 10/2006 | Jung et al. | 713/171 |
| 2007/0022469 A1 | 1/2007 | Cooper et al. | |
| 2008/0072047 A1* | 3/2008 | Sarikaya et al. | 713/171 |
| 2008/0307219 A1* | 12/2008 | Karandikar | H04L 63/166 713/153 |
| 2012/0174196 A1* | 7/2012 | Bhogavilli | H04L 63/1458 726/5 |
| 2012/0236794 A1* | 9/2012 | Jones et al. | 370/328 |
| 2013/0091350 A1* | 4/2013 | Gluck | H04L 63/0281 713/153 |
| 2013/0251151 A1* | 9/2013 | Yamada | 380/270 |

FOREIGN PATENT DOCUMENTS

| | | |
|---|---|---|
| KR | 10-2005-0044126 | 5/2005 |
| KR | 10-2007-0014647 | 2/2007 |

* cited by examiner

AUTHENTICATING METHOD OF COMMUNICATING CONNECTION, GATEWAY APPARATUS USING AUTHENTICATING METHOD, AND COMMUNICATION SYSTEM USING AUTHENTICATING METHOD

CROSS-REFERENCE TO RELATED APPLICATIONS

This application claims the benefit of Korean Patent Application No. 10-2011-0021432, filed on Mar. 10, 2011, in the Korean Intellectual Property Office, the disclosure of which is incorporated herein in its entirety by reference.

BACKGROUND

1. Field

One or more aspects of the present disclosure relate to authentication methods of communicating connection, gateway apparatuses using the authentication methods, and communication systems using the authentication methods, and more particularly, to an authentication method of communicating connection, for increasing communication security between a terminal and a gateway apparatus, a gateway apparatus using the authentication method, and a communication system using the authentication method.

2. Description of the Related Art

Recently, as communications network technologies such as the Internet have been rapidly developed, home network technologies of connecting electronic devices in the home or offices and portable terminals carried by users to each other have been developed.

In addition, along with a recent trend to save energy resources, and to develop and use environmentally friendly products, the development of smart grid technologies have become important. The smart grid is essentially aiming at combining a general grid with an information communications technology and refers to a next generation grid by which power providers and power consumers perform exchange information in two-ways in real time so as to maximize energy efficiencies.

Such home network technologies or smart grid technologies have been rapidly spread to individual homes.

Thus, when home network technologies or smart grid technologies are realized in individual homes, there is a need to provide various services such as security services using previous home network equipment or smart grid equipment instead of using separate devices or equipment, in order to increase user's satisfaction. In addition, if communication connection is required to provide various services, there is a need for a method and apparatus for increasing security of the communication connection.

SUMMARY

One or more aspects of the present disclosure provide an authentication method of communicating connection, for increasing communication security between a terminal and a gateway apparatus, a gateway apparatus using the authentication method, and a communication system using the authentication method.

One or more aspects of the present disclosure provide an authentication method of communicating connection, for correctly providing a home security service, a gateway apparatus using the authentication method, and a communication system using the authentication method.

One or more aspects of the present disclosure provide an authentication method of communicating connection, for increasing reliability of a home security service, a gateway apparatus using the authentication method, and a communication system using the authentication method.

According to an aspect of the present disclosure, there is provided an authentication method of communicating connection between a terminal and a gateway apparatus, the method including transmitting at least one of authentication information and first intrinsic identification information that is intrinsic identification information of the terminal from the terminal to the gateway apparatus and requesting the authentication; authenticating the communicating connection by using at least one of the first intrinsic identification information and the authentication information; and when the authenticating is successful, generating at least one authentication key by using at least one of the first intrinsic identification information and second intrinsic identification information that is intrinsic identification information of the gateway apparatus.

The method may further include, when the authenticating is successful, transmitting connection information for accessing to the gateway apparatus and the at least one authentication key to the terminal.

The first intrinsic identification information may include a media access control (MAC) address of the terminal, and the second intrinsic identification information may include a MAC address of the gateway apparatus.

The method may further include matching the at least one authentication key with the terminal, and storing the at least one authentication key matched with the terminal in the gateway apparatus; and storing the at least one authentication key in the terminal.

The method may further include connecting the terminal to the gateway apparatus by using the connection information; and transmitting predetermined data between the gateway apparatus and the terminal.

The transmitting may include encrypting the predetermined data by using the at least one authentication key and transmitting the encrypted data.

The transmitting may include connecting the terminal to the gateway apparatus by using the connection information, transmitting the first intrinsic identification information, and requesting information monitored by the gateway apparatus; authenticating the terminal, which outputs the requesting, by using the first intrinsic identification information; and when the authenticating is successful, transmitting the monitored information from the gateway apparatus to the terminal.

The method may further include receiving, as the monitored information, a detection result of a security situation from a detecting device included in the same home as the gateway apparatus, in the gateway apparatus.

The requesting of the information may further include transmitting the first intrinsic identification information, which is encrypted using the at least one authentication key, to the gateway apparatus.

The transmitting the monitored information from the gateway apparatus to the terminal may include encrypting the monitored information by using the at least one authentication key, in the gateway apparatus; and transmitting the encrypted information to the terminal.

The method may further include decrypting the encrypted information by using the at least one authentication key, in the terminal.

The at least one authentication key may include a first authentication key for encrypting data to be transmitted; and a second authentication key for decrypting received data.

According to another aspect of the present disclosure, there is provided a gateway apparatus including an authentication processing unit for receiving at least one of authentication information and first intrinsic identification information that is intrinsic identification information of a terminal from the terminal and authenticating communicating connection by using at least one of the first intrinsic identification information and the authentication information; and an authentication key generating unit for, when the authenticating is successful, generating at least one authentication key by using at least one of the first intrinsic identification information and second intrinsic identification information that is intrinsic identification information of the gateway apparatus.

According to another aspect of the present disclosure, there is provided a communication system including a mobile terminal and a gateway apparatus, wherein the mobile terminal transmits at least one of authentication information and first intrinsic identification information that is intrinsic identification information of the terminal from the terminal to the gateway apparatus and requests the authentication of communication connection between the mobile terminal and the gateway apparatus, and wherein the gateway apparatus authenticates the communicating connection by using at least one of the first intrinsic identification information and the authentication information, and generates at least one authentication key by using at least one of the first intrinsic identification information and second intrinsic identification information that is intrinsic identification information of the gateway apparatus, when the authenticating is successful.

Additional aspects and/or advantages will be set forth in part in the description which follows and, in part, will be apparent from the description, or may be learned by practice of the disclosure.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Hereinafter, an authenticating method of communicating connection, a gateway apparatus for the authenticating method, and a communication system for the authenticating method will be described with regard to exemplary embodiments of the disclosure with reference to the attached drawings.

When home network technologies or smart grid technologies are realized in individual homes, a gateway apparatus is indispensably used and is connected to electronic devices contained in individual homes or offices and to predetermined servers, such as servers for providing smart grid information or home networking management servers.

In addition, portable terminals are capable of being connected to communication networks such as the Internet, such as cellular phones, notebook computers, personal digital assistants (PDAs), or portable multimedia players (PMPs), and have been generally spread.

Thus, according to an embodiment of the present disclosure, there is provided an authenticating method of communicating connection between a gateway apparatus and a terminal of a user in individual homes. In addition, according to another embodiment of the present disclosure, there is provided a method of providing a home security service by providing security information through a terminal of which communicating connection with a gateway is authenticated. Moreover, according to embodiments of the present disclosure, there are provided a gateway apparatus using the authenticating method and a communication system using the authenticating method.

Figure 1:
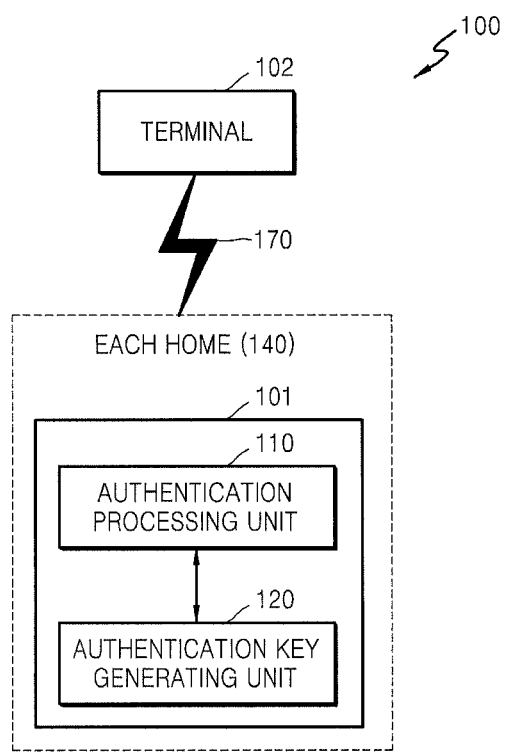
FIG. 1 is a block diagram of a gateway apparatus and a communication system including the gateway apparatus, according to embodiments of the present disclosure.

FIG. 1 is a block diagram of a gateway apparatus 101 and a communication system 100 including the gateway apparatus 101, according to embodiments of the present disclosure.

Referring to FIG. 1, the communication system 100 includes the gateway apparatus 101 and a terminal 102. The gateway apparatus 101 and the terminal 102 may transmit and receive predetermined data through a communication network 170.

The terminal 102 is an electronic device such as a cellular phone, a notebook computer, a personal digital assistant (PDA), or a portable multimedia player (PMP), and is capable of being connected to the communication network 170. In FIG. 1, a single terminal 102 is connected to the gateway apparatus 101. Alternatively, a plurality of terminals, for example, a plurality of cellular phones, notebook computers, PDAs, or PMPs may be connected to the gateway apparatus 101.

The communication network 170 may be formed according to various communication network standards such as local area network (LAN), wide area network (WAN), wireless LAN (WLAN), Wi-Fi, Wireless broadband (Wibro), code division multiple access (CDMA), or wideband code division multiple access (WCDMA).

With reference to FIG. 1, the gateway apparatus 101 includes an authentication processing unit 110, and an authentication key generating unit 120. The gateway apparatus 101 is included in each home 140 that are independent living spaces, such as each house or each office, and is capable of being connected to the communication network 170.

The authentication processing unit 110 receives at least one of intrinsic identification information and authentication information of the terminal 102 from the terminal 102. Hereinafter, the intrinsic identification information of the terminal 102 is referred to as first intrinsic identification information. The authentication processing unit 110 authenticates communicating connection by using at least one of the first intrinsic identification information and the authentication information.

In this case, the authentication information may be information used to authenticate communicating connection between the terminal 102 and the gateway apparatus 101, and may contain a connection password and the like for local authentication. In addition, the first intrinsic identification information may be terminal intrinsic information for identifying the terminal 102, and may contain a media access control (MAC) address of the terminal 102. Since the gateway apparatus 101 has an intrinsic MAC address, the gateway apparatus 101 may be identified using the intrinsic MAC address.

In detail, the authentication processing unit 110 itself may store a connection password that is the authentication information that is used for the gateway apparatus 101 to perform local authentication. In addition, when the connection password that is stored by the authentication processing unit 110 itself is identical to the connection password contained in the authentication information received from the terminal 102, the authentication processing unit 110 determines that authentication is successful. Alternatively, the authentication processing unit 110 may perform such authentication by storing itself an intrinsic identification information list of a terminal 201 that is capable of being connected to a gateway apparatus 101, checking whether the first intrinsic identification information received from the terminal 102 is contained in the intrinsic identification information list that is stored by the authentication processing unit 110 itself and then checking whether connection passwords are identical to each other.

When authentication is successful, communicating connection between the gateway apparatus 101 and the terminal 102 is allowed, and then the terminal 102 is connected to the gateway apparatus 101 so as to transmit and receive predetermined data.

When authentication is successful, the authentication key generating unit 120 generates at least one authentication key by using at least one of the first intrinsic identification information and second intrinsic identification information that is intrinsic identification information of the gateway apparatus 101.

For example, the authentication key generating unit 120 may generate an authentication key having a unique value by combining a MAC address of the gateway apparatus 101 and a MAC address of the terminal 102. Since both the first intrinsic identification information and the second intrinsic identification information are intrinsic values for the gateway apparatus 101 and the terminal 102, exclusiveness or identify of the authentication key may be ensured by generating the authentication key by using the first intrinsic identification information and the second intrinsic identification information. Thus, the authentication key is not overlapped with another authentication key, thereby further increasing security of the authentication key.

The second intrinsic identification information may be used to identify the gateway apparatus 101 and may contain the MAC address of the gateway apparatus 101.

At least one authentication key that is generated by the authentication key generating unit 120 and is stored in a predetermined space of the gateway apparatus 101 will be described in detail with reference to FIG. 3.

Figure 2:
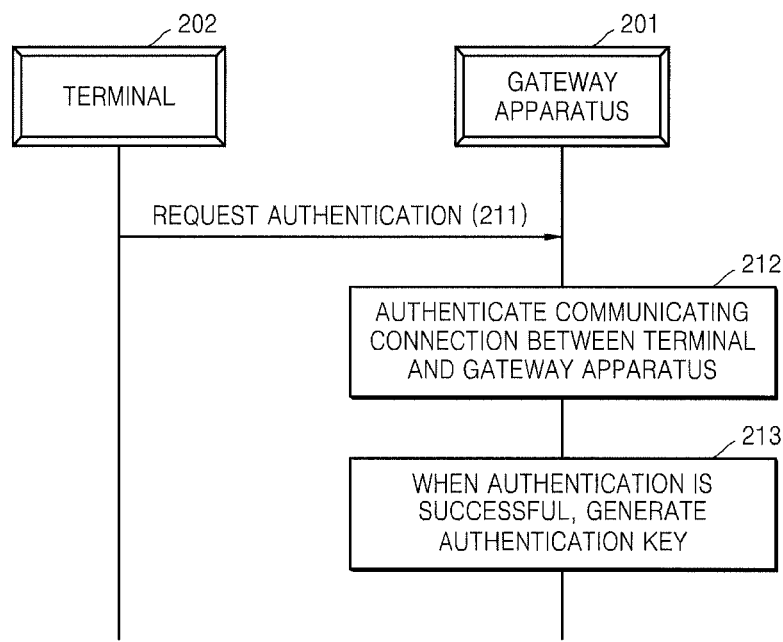
FIG. 2 is a diagram for explaining an authenticating method of communicating connection, according to an embodiment of the present disclosure.

FIG. 2 is a diagram for explaining an authenticating method of communicating connection, according to an embodiment of the present disclosure. The authenticating method according to the present embodiment may be performed by at least one of the gateway apparatus 101, the terminal 102 and the communication system 100 which have been described with reference to FIG. 1. In addition, operations included in the authenticating method according to the present embodiment are substantially the same as operations of the gateway apparatus 101 and the communication system 100 including the gateway apparatus 101 which have been described with reference to FIG. 1, and thus will not be repeatedly described.

A gateway apparatus 201 and a terminal 202 of FIG. 2 correspond to the gateway apparatus 101 and the terminal 102 of FIG. 1, respectively.

Referring to FIG. 2, in the authenticating method according to the present embodiment, at least one of authentication information and the first intrinsic identification information that is intrinsic identification information of the terminal 202 are transmitted from the terminal 202 to the gateway apparatus 201, and then the terminal 202 requests the gateway apparatus 201 for authenticating communicating connection between the terminal 202 and the gateway apparatus 201 (operation 211).

The gateway apparatus 201 authenticates the communicating connection by using at least one of the first intrinsic identification information and the authentication information which are received in operation 211 (operation 212).

When authentication of operation 212 is successful, at least one authentication key is generated by using at least one of the first intrinsic identification information and second intrinsic identification information that is intrinsic identification information of the gateway apparatus 201 (operation 213). At least one authentication key that is generated in operation 213 and is stored a predetermined space will be described in detail with reference to FIG. 3.

Figure 3:
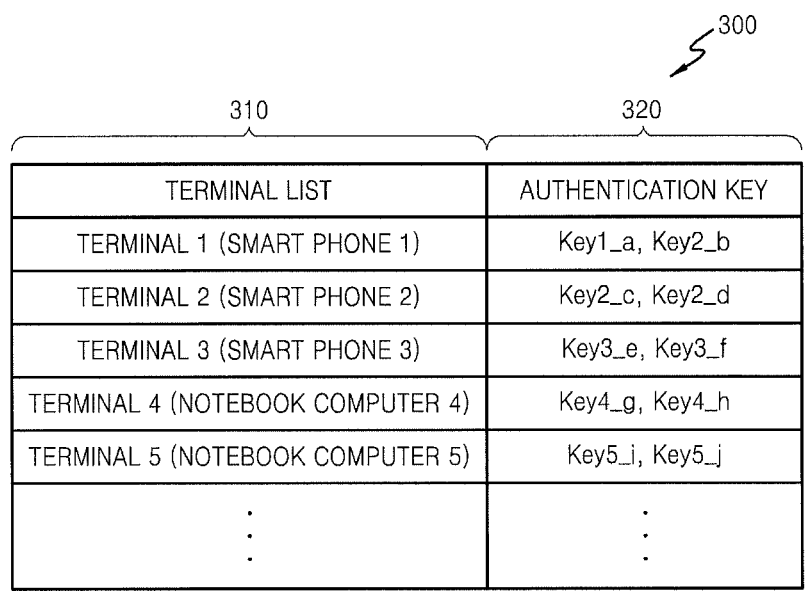
FIG. 3 is a diagram for explaining authentication keys stored in at least one of a gateway apparatus and a terminal of FIG. 2.

FIG. 3 is a diagram for explaining authentication keys stored in at least one of the gateway apparatus 201 and the terminal 202 of FIG. 2.

When the communicating connection between the gateway apparatus 201 and the terminal 202 is successfully authenticated, and then predetermined data is transmitted between the gateway apparatus 201 and the terminal 202, the authentication key generating unit 120 of the gateway apparatus 201 generates at least one authentication key required to encrypt or decrypt the predetermined data. For example, the at least one authentication key generated by the authentication key generating unit 120 may include an encryption key and a decryption key.

The predetermined data may be encrypted or decrypted by using various methods using an authentication key. For example, the encryption key and the decryption key are configured as a pair, and data is encrypted and decrypted by using the encryption key and the decryption key, respectively.

The authentication key generating unit 120 generates at least one authentication key corresponding to each respective terminal. In FIG. 3, with regard to a terminal 1 (a smart phone 1), the at least one authentication key includes an encryption key (key1_a) and a decryption key (Key2_b).

When the gateway apparatus 201 is connected to a plurality of terminals, the authentication key generating unit 120 may generate at least one authentication key corresponding to each respective terminal among the plurality of terminals that is authenticated. The at least one authentication key of FIG. 3 may match each respective terminal and may be stored in a storage space (a storage unit 432 of FIG. 4 described below) of the gateway apparatus 201. That is, database 300 containing authentication key information is stored in the storage space of the gateway apparatus 201.

In detail, a product number, a MAC address, a serial number, or the like of a terminal as an identification burst of the terminal may be recorded in a terminal list 310, and values of authentication keys corresponding to respective terminals may be recorded in a region 320.

Figure 4:
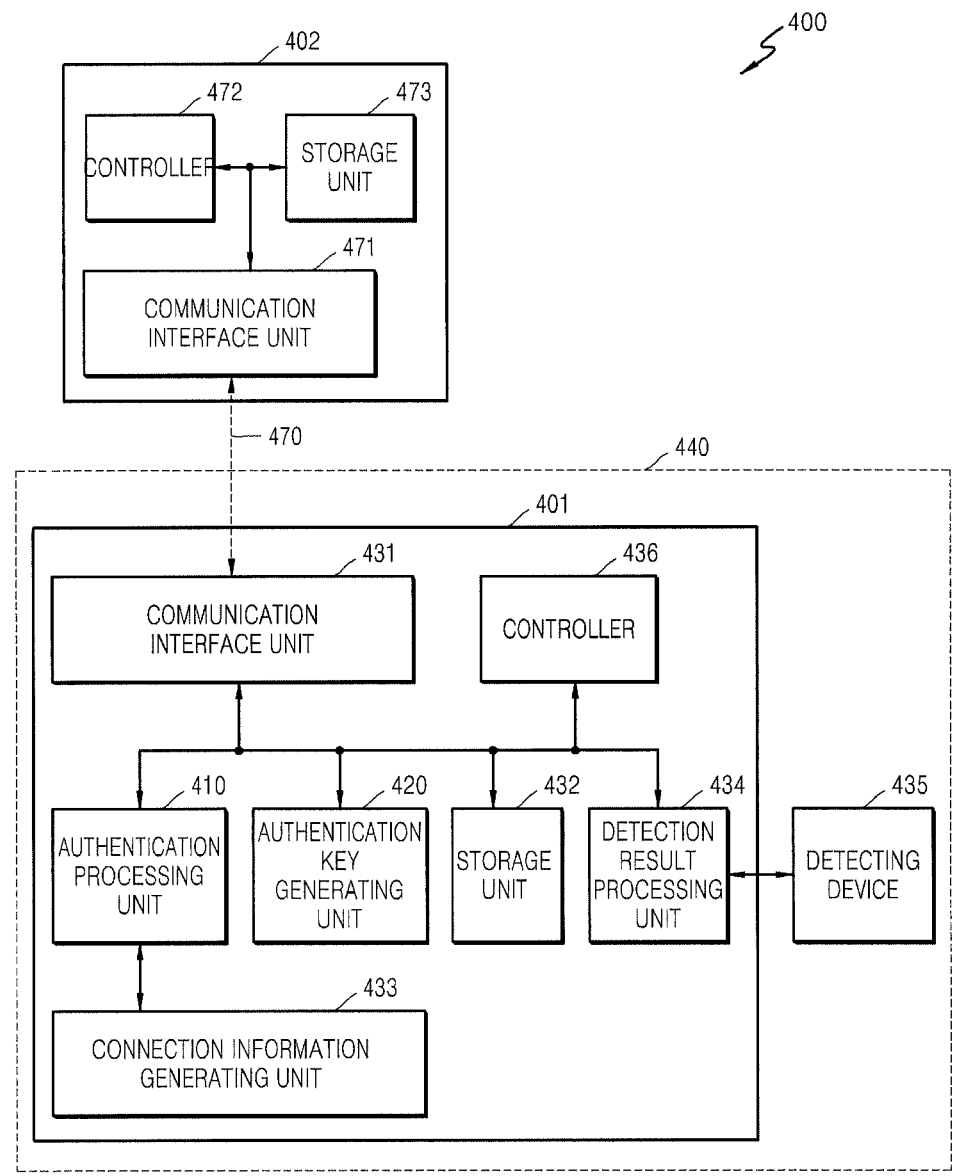
FIG. 4 is a block diagram of a gateway apparatus and a communication system including the gateway apparatus, according to other embodiments of the present disclosure.

FIG. 4 is a block diagram of a gateway apparatus 401 and a communication system 400 including the gateway apparatus 401, according to other embodiments of the present disclosure. The communication network 400, the gateway apparatus 401, a terminal 402, the authentication processing unit 410, an authentication key generating unit 420, each home 440 and a communication network 470 of FIG. 4 correspond to the communication system 100, the gateway apparatus 101, the terminal 102, the authentication processing unit 110, the authentication key generating unit 120, the each home 140, and the communication network 170 which have been described with reference to FIG. 1, respectively, and thus will not be repeatedly described.

Referring to FIG. 4, the gateway apparatus 401 may further include at least one of a communication interface unit 431, a storage unit 432, a connection information generating unit 433, a detection result processing unit 434, and a controller 436, compared to the gateway apparatus 101 of FIG. 1. In addition, the terminal 402 may include a communication interface unit 471, a controller 472, and a storage unit 473.

Figure 5:
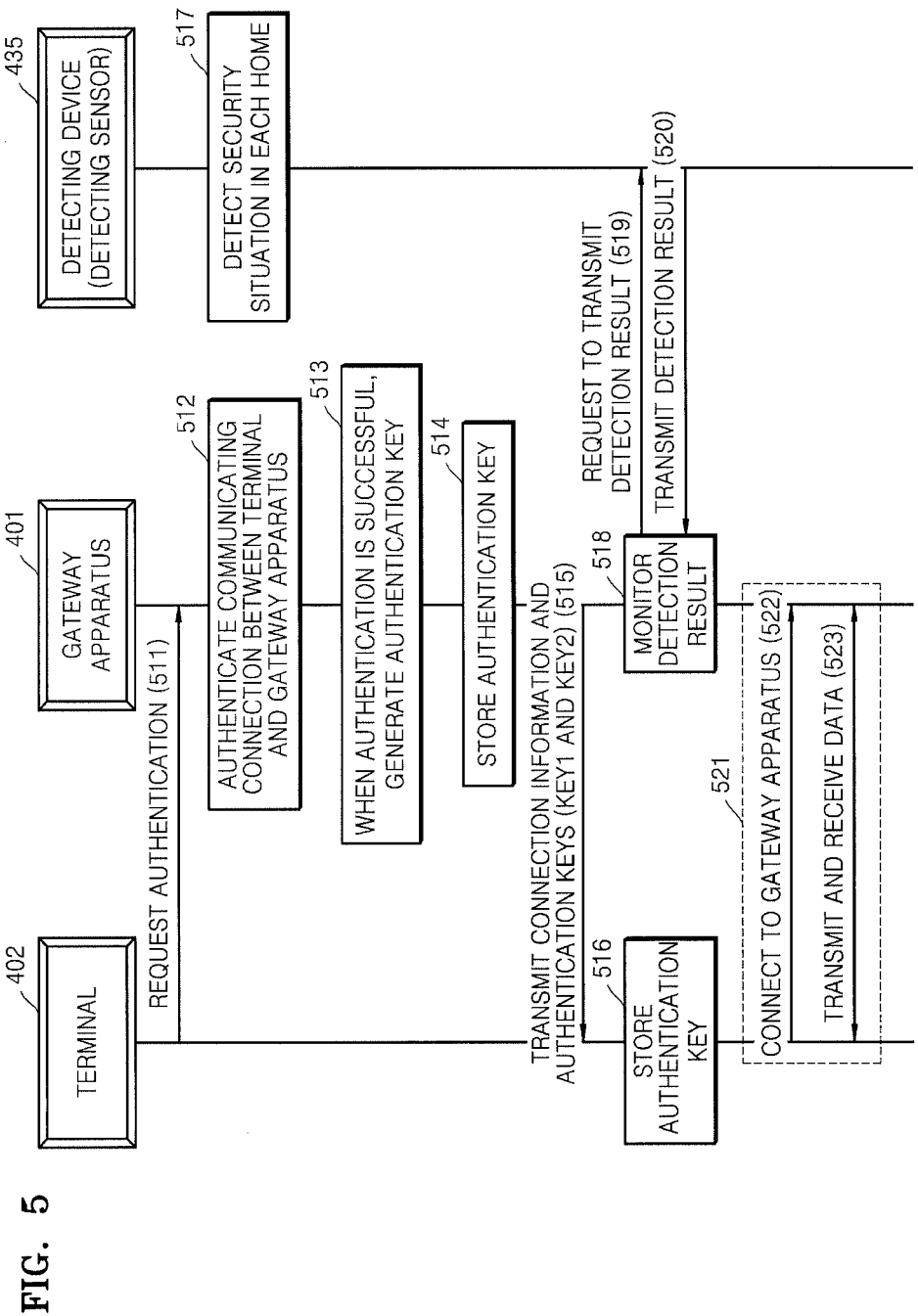
FIG. 5 is a diagram for explaining an authenticating method of communicating connection, according to another embodiment of the present disclosure.

FIG. 5 is a diagram for explaining an authenticating method of communicating connection, according to another embodiment of the present disclosure. The authenticating method according to the present embodiment may be performed by at least one of the gateway apparatus 401, the terminal 402, and the communication network 400 which have been described with reference to FIG. 4. Thus, with respect to FIGS. 4 and 5, detailed operations of the gateway apparatus 401 and the communication network 400, and an authenticating method including the operations will be described in detail.

Referring to FIG. 5, operations 511, 512, and 513 of FIG. 5 are the same as operations 211, 212, and 213 of FIG. 2, respectively, and thus will not be repeatedly described.

The each home 440 may include a detecting device 435 for detecting whether intrusion occurs. The detecting device 435 detects a security situation of the each home 440 (operation 517). In detail, the detecting device 435 may include at least one of a heat sensor, a movement sensor, a physical shock sensor, or the like. The detecting device 435 may output information containing a detection result of the security situation. In this case, the detection result of the security situation may be information used to determine whether intrusion into the each home 440 occurs. For example, when the detecting device 435 detects movement by using a movement detecting camera, the detecting device 435 may photograph a corresponding situation and may output a captured moving picture to the gateway apparatus 401.

The storage unit 432 stores at least one authentication key generated by the authentication key generating unit 420 (operation 514). In detail, the storage unit 432 may match and store the at least one authentication key with each respective terminal, and may store the database 300 (refer to FIG. 3) containing the terminal list 310 that is a list of terminals that are capable of being connected to the gateway apparatus 401.

The connection information generating unit 433 may generate or store information required for the terminal 402 to be connected to the gateway apparatus 401. In detail, the connection information generating unit 433 may include a dynamic domain name server (DDNS) for generating, as connection information, a uniform resource locator (URL) that is a logic address required for the terminal 402 to be connected to the gateway apparatus 401.

Referring to FIGS. 4 and 5, when authentication of operation 512 is successful, the controller 436 of the gateway apparatus 401 control the connection information generating unit 433 and the authentication key generating unit 420 so as to transmit the connection information generated by the connection information generating unit 433 and the at least one authentication information generated by the authentication key generating unit 420 (operation 515). FIG. 5 shows a case where an encryption key (Key1) and a decryption key (Key2) are transmitted.

In addition, the controller 436 may encrypt and transmit the connection information by using the at least one authentication key generated in operation 513, for example, the encryption key (Key1).

Operation 515 may be performed by the authentication processing unit 410.

The communication interface unit 431 includes a communication module for transmitting and receiving predetermined data through the communication network 470. For example, when the communication network 470 is a Wi-Fi network, the communication interface unit 431 may include a Wi-Fi communication module. The communication interface unit 431 transmits the at least one authentication information and the connection information to the communication interface unit 471 of the terminal 402, according to the control of the controller 436.

The communication interface unit 471 of the terminal 402 corresponds to the communication interface unit 431, and may include a communication module for transmitting and receiving predetermined data through the communication network 470.

The controller 472 of the terminal 402 receives the at least one authentication key and the connection information through the communication interface unit 471. The controller 472 controls the storage unit 473 so as to store the at least one authentication key and the connection information in the storage unit 473.

The storage unit 473 of the terminal 402 stores the at least one authentication key and the connection information which are transmitted in operation 515, according to the control of the controller 472 (operation 516).

The controller 472 of the terminal 402 may access the gateway apparatus 401 by using the connection information transmitted in operation 515, and may transmit and receive predetermined data to and from the gateway apparatus 401 (operation 521).

In detail, the controller 472 of the terminal 402 may be access the gateway apparatus 401 by using the connection information transmitted in operation 515 (operation 522).

When the connection of operation 522 is completed, the controller 472 of the terminal 402 may transmit and receive predetermined data to and from the gateway apparatus 401 (operation 523). In addition, the controller 436 of the gateway apparatus 401 may also transmit and receive predetermined data to and from the terminal 402 (operation 523).

In detail, the controller 472 of the terminal 402 may encrypt predetermined data by using the at least one authentication key stored in operation 516, and may transmit the encrypted data to the gateway apparatus 401. The controller 436 of the gateway apparatus 401 may encrypt predetermined data by using the at least one authentication key stored in operation 514, and may transmit the encrypted data to the terminal 402.

The detection result processing unit 434 monitors the detection result of the security situation detected by the detecting device 435 (operation 518). The monitoring of operation 518 may be performed at a frequency corresponding to a predetermined period of time.

In detail, the detection result processing unit 434 may request the detecting device 435 to transmit the detection result of the security situation detected by the detecting device 435 (operation 519). The detection result processing unit 434 receives the detection result output from the detecting device 435 (operation 520).

The detection result processing unit 434 may be connected to the detecting device 435 through a wired/wireless communication network, and may read the detection result output from the detecting device 435 in real time or may automatically receive the detection result so as to monitor the detection result (operation 518). In addition, the data that is transmitted and received in operation 521 may contain the detection result of the security situation that is monitored in operation 518.

Figure 6:
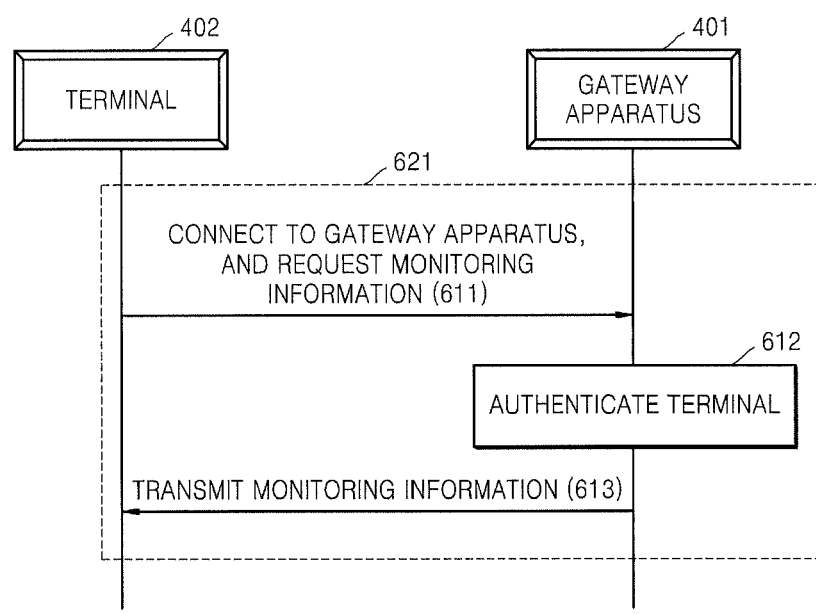
FIG. 6 is a diagram for explaining an operation 521 of FIG. 5 in detail, according to an embodiment of the present disclosure.

FIG. 6 is a diagram for explaining operation 521 of FIG. 5 in detail, according to an embodiment of the present disclosure.

Referring to FIG. 6, operations 621, 611, and 613 correspond to operations 521, 522, and 523 of FIG. 5, respectively, and thus will not be repeatedly described.

Referring to FIG. 6, the controller 472 of the terminal 402 is connected to the gateway apparatus 401 by using the connection information. Simultaneously with or subsequently to the connection, the controller 472 of the terminal 402 transmits the first intrinsic identification information, and requests the gateway apparatus 401 for information monitored by the detection result processing unit 434 (operation 611).

When the controller 436 of the gateway apparatus 401 receives the requesting of operation 611, the controller 436 authenticates the terminal 402 by using the first intrinsic identification information transmitted in operation 611 (operation 612). In detail, the controller 436 may authenticate the connecting and requesting of operation 611 by determining whether the first intrinsic identification information is contained in the terminal list stored in the storage unit 432 and corresponds to a value corresponding to a terminal that is authentication-connected.

When the authentication of operation 612 is completed, the controller 436 transmits the information monitored in the detection result processing unit 434 to the terminal 402 (operation 613).

Figure 7:
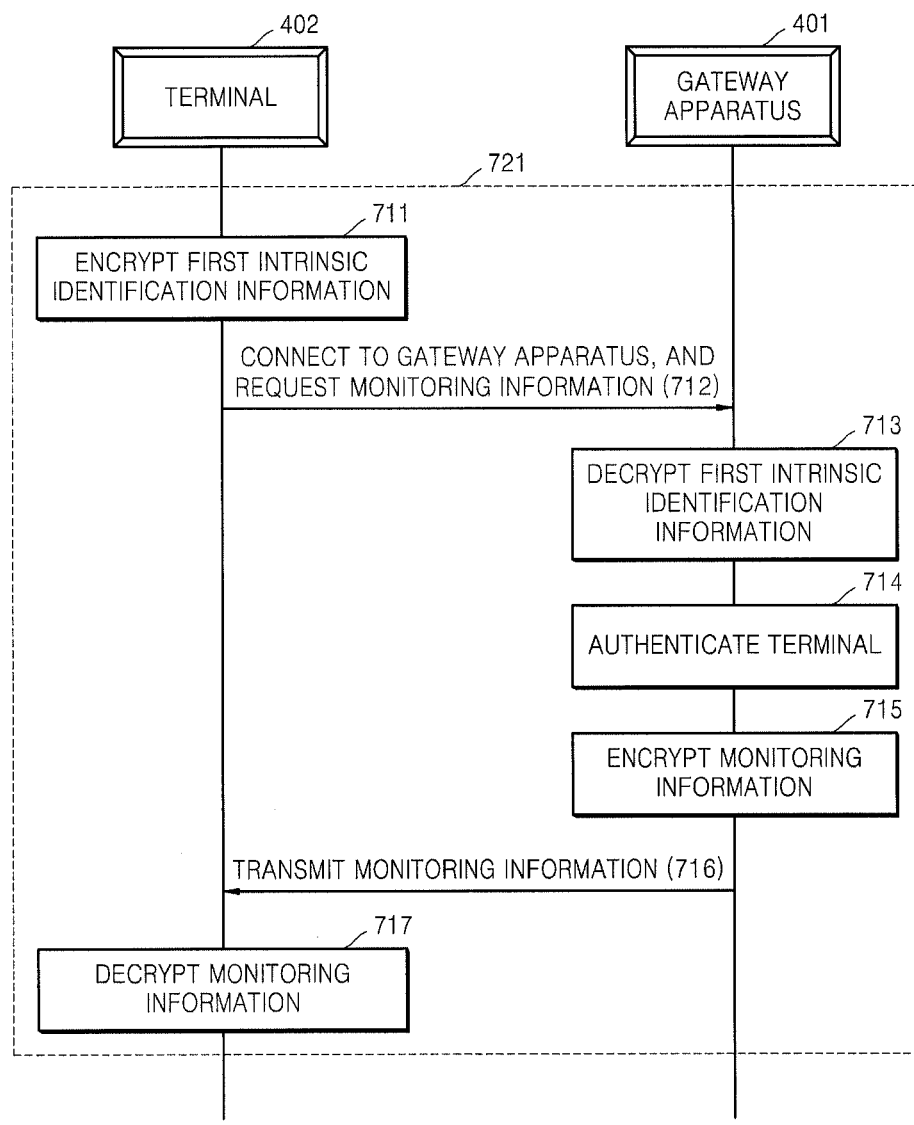
FIG. 7 is a diagram for explaining an operation 621 of FIG. 6 in detail, according to another embodiment of the present disclosure.

FIG. 7 is a diagram for explaining operation 621 of FIG. 6 in detail, according to another embodiment of the present disclosure.

Referring to FIG. 7, operations 712, 714, 716, and 721 correspond to operations 611, 612, 613, and 621 of FIG. 6, respectively. Hereinafter, with reference to FIGS. 4, 6, and 7, operation 721 of FIG. 7 will be described in detail.

The controller 472 of the terminal 402 encrypts the first intrinsic identification information by using the at least one authentication key stored in the storage unit 473 (operation 711). Hereinafter, a case where the at least one authentication key includes a pair of the encryption key (Key1) and the decryption key (Key2) will be described. When the encryption key (Key1) and the decryption key (Key2) are configured to be a pair, data that is encrypted by using the encryption key (Key1) may be decrypted by using the decryption key (Key2). In this case, the controller 472 may encrypt the first intrinsic identification information by using the encryption key (Key1).

The controller 472 of the terminal 402 transmits the first intrinsic identification information that is encrypted in operation 711 to the gateway apparatus 401, and requests the gateway apparatus 401 to transmit monitoring information (operation 712). When encrypted data is transmitted, the data may be prevented from being hacked or being transmitted to an undesired electronic device, thereby increasing security during transmission and reception of data.

The controller 436 of the gateway apparatus 401 may decrypt the first intrinsic identification information by using the at least one authentication key (operation 713). In the above-described example, the controller 436 may decrypt the first intrinsic identification information by using the decryption key (Key2).

The controller 436 authenticates the terminal 402 that transmits the requesting of operation 712 (operation 714).

When the authenticating of operation 714 is successful, the controller 436 encrypts the information monitored in the detection result processing unit 434 by using the at least one authentication key (operation 715). In the above-described example, the controller 436 encrypts the information by using the encryption key (Key1).

The controller 436 controls the gateway apparatus 401 so as to transmit the information encrypted in operation 715 to the terminal 402 (operation 716).

The controller 472 of the terminal 402 decrypts the information transmitted in operation 716 by using the at least one authentication key (operation 717). In the above-described example, the controller 472 decrypts the encrypted information by using the decryption key (Key2).

As described above, according to one or more embodiments of the present disclosure, an authentication method of communicating connection, a gateway apparatus using the authentication method, and a communication system using the authentication method may strictly manage a terminal that is connected to a gateway apparatus by performing local authentication, performed in the gateway apparatus, by using intrinsic identification information of the terminal, which is.

In addition, information about a security situation is transmitted to only a terminal of which communication connection is authenticated, thereby correctly providing a home security service.

Moreover, encrypted information about a security situation is transmitted to only a terminal of which communication connection is authenticated, thereby increasing reliability of a home security service.

The above-described exemplary embodiments may include program instructions which may be recorded in computer-readable media to implement various operations embodied on a hardware computing device. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

While the present disclosure has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An authentication method of a gateway apparatus, the method comprising:
   receiving, from a terminal, first intrinsic identification information that is intrinsic identification information of the terminal;
   authenticating the communicating connection by using the first intrinsic identification information;
   when the authenticating is successful, generating at least one authentication key by using at least one of the first intrinsic identification information and second intrinsic identification information that is intrinsic identification information of the gateway apparatus;
   transmitting, to the terminal, encrypted connection information for accessing the gateway apparatus and the at least one authentication key;
   receiving, from the terminal, a request of monitored information; and
   transmitting, to the terminal, encrypted monitored information,
   wherein the monitored information includes intrusion information indicating whether intrusion into a home occurs.

2. The method of claim 1, wherein the first intrinsic identification information comprises a media access control (MAC) address of the terminal, and
   wherein the second intrinsic identification information comprises a MAC address of the gateway apparatus.

3. The method of claim 1, further comprising:
   matching the at least one authentication key with the terminal, and storing the at least one authentication key matched with the terminal in the gateway apparatus; and
   storing the at least one authentication key in the terminal.

4. The method of claim 1, wherein the gateway apparatus and the terminal transit data to each other by using the at least one authentication key.

5. The method of claim 1, wherein the receiving the request of the monitored information comprises:
   receiving the first intrinsic identification information from the terminal;
   authenticating the terminal by using the first intrinsic identification information; and
   when the authenticating is successful, transmitting the monitored information.

6. The method of claim 5, further comprising receiving the detection result of a security situation from a detecting device included in the same home as the gateway apparatus.

7. The method of claim 5, wherein the receiving the first intrinsic identification information comprises receiving the first intrinsic identification information, which is encrypted using the at least one authentication key.

8. The method of claim 1, wherein the receiving the encrypted monitored information comprises encrypting the monitored information by using the at least one authentication key.

9. The method of claim 1, further comprising decrypting the encrypted monitored information by using the at least one authentication key, in the terminal.

10. The method of claim 1, wherein the at least one authentication key comprises:
    a first authentication key for encrypting data to be transmitted; and
    a second authentication key for decrypting received data.

11. A gateway apparatus comprising:
    an authentication processor to receive first intrinsic identification information that is intrinsic identification information of a terminal from the terminal and authenticate communicating connection by using the first intrinsic identification information;
    an authentication key generator to, when the authenticating is completed and successful, generate at least one authentication key by using at least one of the first intrinsic identification information and second intrinsic identification information that is intrinsic identification information of the gateway apparatus;
    a communication interface to transmit encrypted connection information for accessing the gateway apparatus and the at least one authentication key to the terminal; and
    a controller to control the communication interface so as to transmit encrypted monitored information, when the terminal transmits transmit and receive a request of monitored information,
    wherein the monitored information includes intrusion information indicating whether intrusion into a home occurs.

12. The gateway apparatus of claim 11, wherein the first intrinsic identification information comprises a media access control (MAC) address of the terminal, and
    wherein the second intrinsic identification information comprises a MAC address of the gateway apparatus.

13. The gateway apparatus of claim 11, further comprising a detection result processor to receive the detection result of a security situation from a detecting device included in the same home as the gateway apparatus and to monitor the security situation.

14. The gateway apparatus of claim 13, wherein the communication unit receives the first intrinsic identification information for requesting the monitored information by the detection result processor, and
    the controller authenticates the terminal by using the first intrinsic identification information and controls the communication interface so as to transmit the encrypted monitored information to the terminal when the authenticating is successful.

15. The gateway apparatus of claim 14, wherein the controller encrypts the monitored information by using the at least one authentication key.

16. The gateway apparatus of claim 14, wherein the communication interface receives the encrypted first intrinsic identification information from the terminal, and the controller decrypts the first intrinsic identification information by using the at least one authentication key.

17. The gateway apparatus of claim 11, further comprising a storage to match and store the at least one authentication key matched with the terminal.

18. A communication system comprising a mobile terminal and a gateway apparatus,
    wherein the mobile terminal transmits first intrinsic identification information that is intrinsic identification information of the terminal from the terminal to the gateway apparatus and requests the authentication of communication connection between the mobile terminal and the gateway apparatus, and
    wherein the gateway apparatus authenticates the communicating connection by using the first intrinsic identification information, generates at least one authentication key by using at least one of the first intrinsic identification information and second intrinsic identification information that is intrinsic identification information of the gateway apparatus, when the authenticating is completed and successful, transmits encrypted connection information for accessing the gateway apparatus and the at least one authentication key to the terminal, and transmits encrypted monitored information which includes intrusion information indicating whether intrusion into a home occurs, when the terminal requests monitored information.

19. The method of claim 1, wherein the gateway apparatus generates the at least one authentication key by combining the first intrinsic identification information with the second intrinsic identification information.

* * * * *